US010477371B2

United States Patent
Gulati et al.

(10) Patent No.: US 10,477,371 B2
(45) Date of Patent: Nov. 12, 2019

(54) DSRC-LTE V2V CO-CHANNEL LONG TERM COEXISTENCE

(71) Applicant: QUALCOMM Incorporated, San Diego, CA (US)

(72) Inventors: Kapil Gulati, Dover, DE (US); Shailesh Patil, Raritan, NJ (US); Gaurav Gupta, Los Angeles, CA (US); Sudhir Kumar Baghel, Hillsborough, NJ (US); Marco Papaleo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/465,877

(22) Filed: Mar. 22, 2017

(65) Prior Publication Data
US 2018/0014146 A1 Jan. 11, 2018

Related U.S. Application Data

(60) Provisional application No. 62/359,902, filed on Jul. 8, 2016.

(51) Int. Cl.
*H04W 4/80* (2018.01)
*H04W 4/70* (2018.01)
(Continued)

(52) U.S. Cl.
CPC .............. *H04W 4/80* (2018.02); *H04W 4/70* (2018.02); *H04W 8/005* (2013.01); *H04W 16/14* (2013.01); *H04W 76/10* (2018.02); *H04W 88/02* (2013.01)

(58) Field of Classification Search
CPC ... H04W 76/023; H04W 8/005; H04W 4/008; H04W 72/02; H04W 72/042;
(Continued)

(56) References Cited

U.S. PATENT DOCUMENTS

2015/0009864 A1* 1/2015 Kim .................... H04W 12/02
370/259
2015/0195827 A1* 7/2015 Feng ................... H04L 63/0428
380/270
(Continued)

OTHER PUBLICATIONS

Catt: "Considerations on V2V Traffic Priority and Relative Resource Allocation",3GPP Draft; R1-160366, 3rd Generation Partnership Project (3GPP), Mobile Competence Centre; 650, Route Des Lucioles ; F-06921 Sophiaantipolis Cedex; France, vol. RAN WG1, No. St Julian's, Malta; 20160215-20160219 Feb. 5, 2016 (Feb. 5, 2016), XP051063745, 3 Pages, Retrieved from the Internet: URL:http://www.3gpp.org/ftp/tsg_ran/WG1_RL1/TSGR1_84/Docs/ [retrieved on Feb. 5, 2016].

(Continued)

*Primary Examiner* — Golam Sorowar
(74) *Attorney, Agent, or Firm* — Arent Fox, LLP

(57) ABSTRACT

An effective way for the cellular device-to-device communication and the short range communication to share a set of channels for communication is desired. The apparatus may be a user equipment (UE). The apparatus determines a priority level of each channel of a plurality of channels. The apparatus determines whether a first channel of the plurality of channels, the first channel having a highest priority level, is occupied by short range wireless communication. If the first channel is occupied by the short range wireless communication, the apparatus determines availability of one or more remaining channels of the plurality of channels for a cellular device-to-device (D2D) communication, where the one or more remaining channels are different from the first channel.

27 Claims, 11 Drawing Sheets

(51) Int. Cl.
    *H04W 8/00*       (2009.01)
    *H04W 16/14*     (2009.01)
    *H04W 76/10*     (2018.01)
    *H04W 88/02*     (2009.01)

(58) Field of Classification Search
    CPC ... H04W 72/0453; H04W 4/005; H04W 4/02; H04W 52/383; H04W 72/0446; H04W 72/048; H04W 88/02; H04W 4/001; H04W 4/046; H04W 72/04; H04W 72/10; H04W 76/02
    See application file for complete search history.

(56) References Cited

U.S. PATENT DOCUMENTS

| | | | |
|---|---|---|---|
| 2016/0014663 A1* | 1/2016 | Berggren | H04W 36/22 455/436 |
| 2016/0295589 A1 | 10/2016 | Nikopour et al. | |
| 2016/0337982 A1* | 11/2016 | Yang | H04W 16/14 |
| 2017/0188391 A1* | 6/2017 | Rajagopal | H04W 74/0816 |
| 2017/0230839 A1* | 8/2017 | Cui | H04W 16/14 |
| 2018/0014317 A1 | 1/2018 | Gulati et al. | |

OTHER PUBLICATIONS

International Search Report and Written Opinion—PCT/US2017/035964—ISA/EPO—Sep. 29, 2017.

LG Electronics: "Discussion on Coexisting LTE-V2V and IEEE802 .11p on the Same Carrier", 3GPP Draft; R1-164540 Co-Channel Coexistence with DSRC, 3rd Generation Partnership Project (3GPP), Mobile Competence Centre; 650, Route Des Lucioles; F-06921 Sophia-Antipolis Cedex; France, vol. RAN WG1, No. Nanjing, China; 20160523-20160527, May 14, 2016 (May 14, 2016), XP051096396, pp. 1-6, Retrieved from the Internet: URL: http://www.3gpp.org/ftp/tsg_ran/WG1_RL1/TSGR1_85/Docs/ [retrieved on May 14, 2016].

Samsung: "DSRC Co-Existence with V2V", 3GPP Draft; R1-162702 DSRC Co-Existence With V2V, 3rd Generation Partnership Project (3GPP), Mobile Competence Centre; 650, Route Des Lucioles; F-06921 Sophia-Antipolis Cedex; France, vol. RAN WG1, No. Busan, Korea; 20160411-20160415, Apr. 2, 2016 (Apr. 2, 2016), XP051080354, 3 Pages, Retrieved from the Internet: URL:http://www.3gpp.org/ftp/tsg ran/WG1_RL1/TSGR1_84b/Docs/ [retrieved on Apr. 2, 2016].

* cited by examiner

DSRC-LTE V2V CO-CHANNEL LONG TERM COEXISTENCE

CROSS-REFERENCE TO RELATED APPLICATION(S)

This application claims the benefit of U.S. Provisional Application Ser. No. 62/359,902, entitled "DSRC-LTE V2V CO-CHANNEL LONG TERM COEXISTENCE" and filed on Jul. 8, 2016, which is expressly incorporated by reference herein in its entirety.

BACKGROUND

Field

The present disclosure relates generally to communication systems, and more particularly, to cellular-based device-to-device communication and short range communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Device-to-device communication has been under development to provide a way for a user equipment to directly communicate with another user equipment using cellular technology such as LTE. Improvements are being continuously made to provide reliable device-to-device communication in various circumstances.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Device-to-device (D2D) communication based on cellular technology such as LTE has been under development. The cellular D2D communication may be implemented as vehicle-to-vehicle (V2V) communication to provide a way for vehicles to communicate with each other. Short range communication such as dedicated short range communication (DSRC) has also been used for V2V communication. When the cellular D2D communication and the short range communication share the same set of channels, a collision from two different means of communication (e.g., cellular D2D communication and short range communication) on the same channel(s) may occur when the cellular D2D communication and the short range communication are used for V2V communication. Therefore, a way for the cellular D2D communication and the short range communication to share a set of channels for V2V communication that reduces collisions in the shared channels is desired.

In an aspect of the disclosure, a method, a computer-readable medium, and an apparatus are provided. The apparatus may be a user equipment (UE). The apparatus determines a priority level of each channel of a plurality of channels. The apparatus determines whether a first channel of the plurality of channels, the first channel having a highest priority level, is occupied by short range wireless communication. If the first channel is occupied by the short range wireless communication, the apparatus determines availability of one or more remaining channels of the plurality of channels for a cellular device-to-device (D2D) communication, wherein the one or more remaining channels are different from the first channel.

In an aspect, the apparatus may be a UE. The apparatus includes means for determining a priority level of each channel of a plurality of channels. The apparatus includes means for determining whether a first channel of the plurality of channels, the first channel having a highest priority level, is occupied by short range wireless communication. The apparatus includes means for determining availability of one or more remaining channels of the plurality of channels for a cellular D2D communication if the first channel is occupied by the short range wireless communication, wherein the one or more remaining channels are different from the first channel.

In an aspect, the apparatus may be a UE including a memory and at least one processor coupled to the memory. The at least one processor may be configured to: determine a priority level of each channel of a plurality of channels, determine whether a first channel of the plurality of channels, the first channel having a highest priority level, is occupied by short range wireless communication, and if the first channel is occupied by the short range wireless communication, determine availability of one or more remaining channels of the plurality of channels for a cellular D2D communication, wherein the one or more remaining channels are different from the first channel.

In an aspect, a computer-readable medium storing computer executable code may include code to: determine a priority level of each channel of a plurality of channels, determine whether a first channel of the plurality of channels, the first channel having a highest priority level, is occupied by short range wireless communication, and if the first channel is occupied by the short range wireless communication, determine availability of one or more remaining channels of the plurality of channels for a cellular D2D communication, wherein the one or more remaining channels are different from the first channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
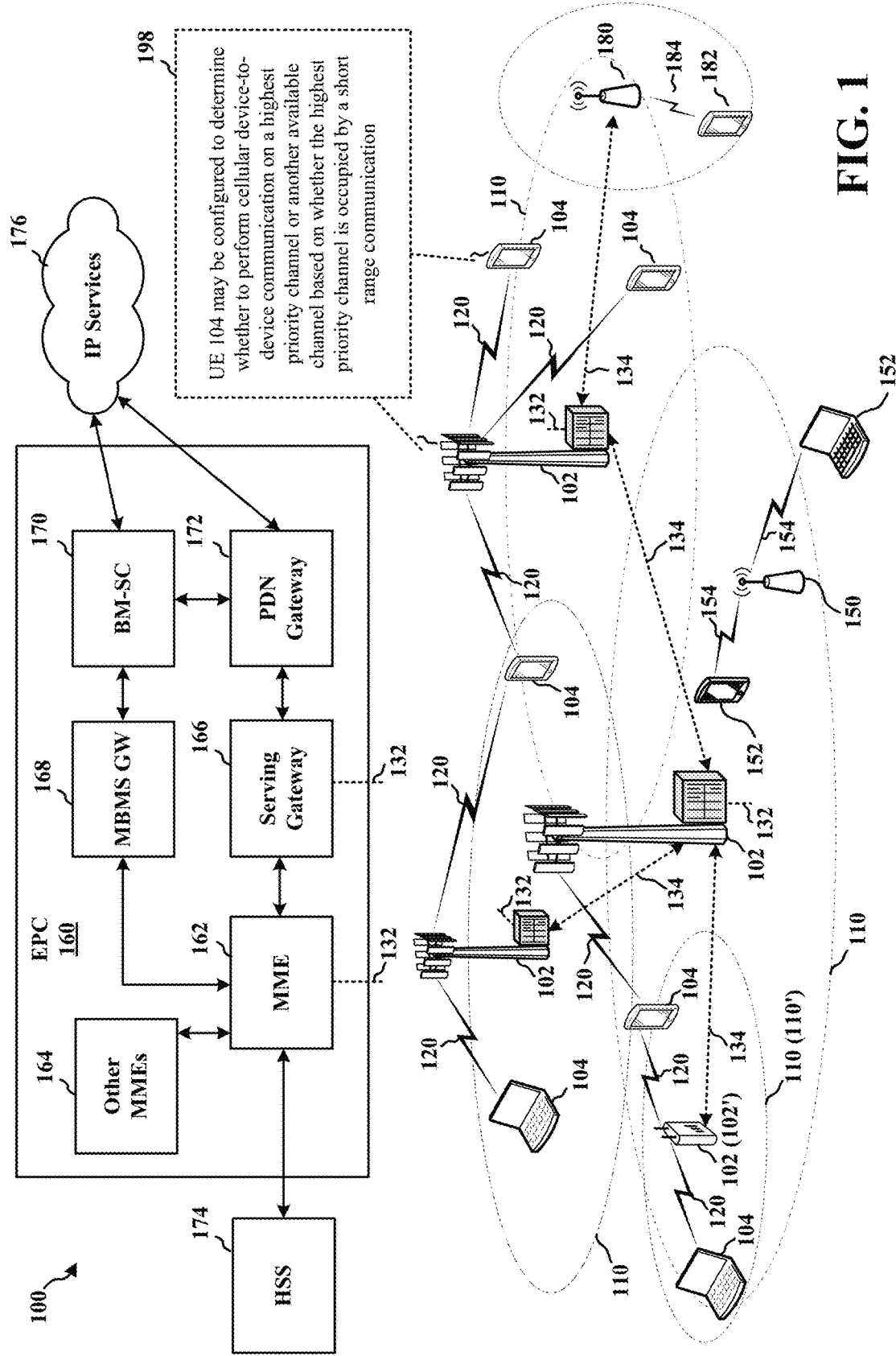
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine whether to perform cellular device-to-device communication on a highest priority channel or another available channel based on whether the highest priority channel is occupied by a short range communication (198). The highest priority channel may be an unlicensed spectrum shared channel used for V2V communication by devices capable of cellular device-to-device communication and/or short range communication.

Figure 2:
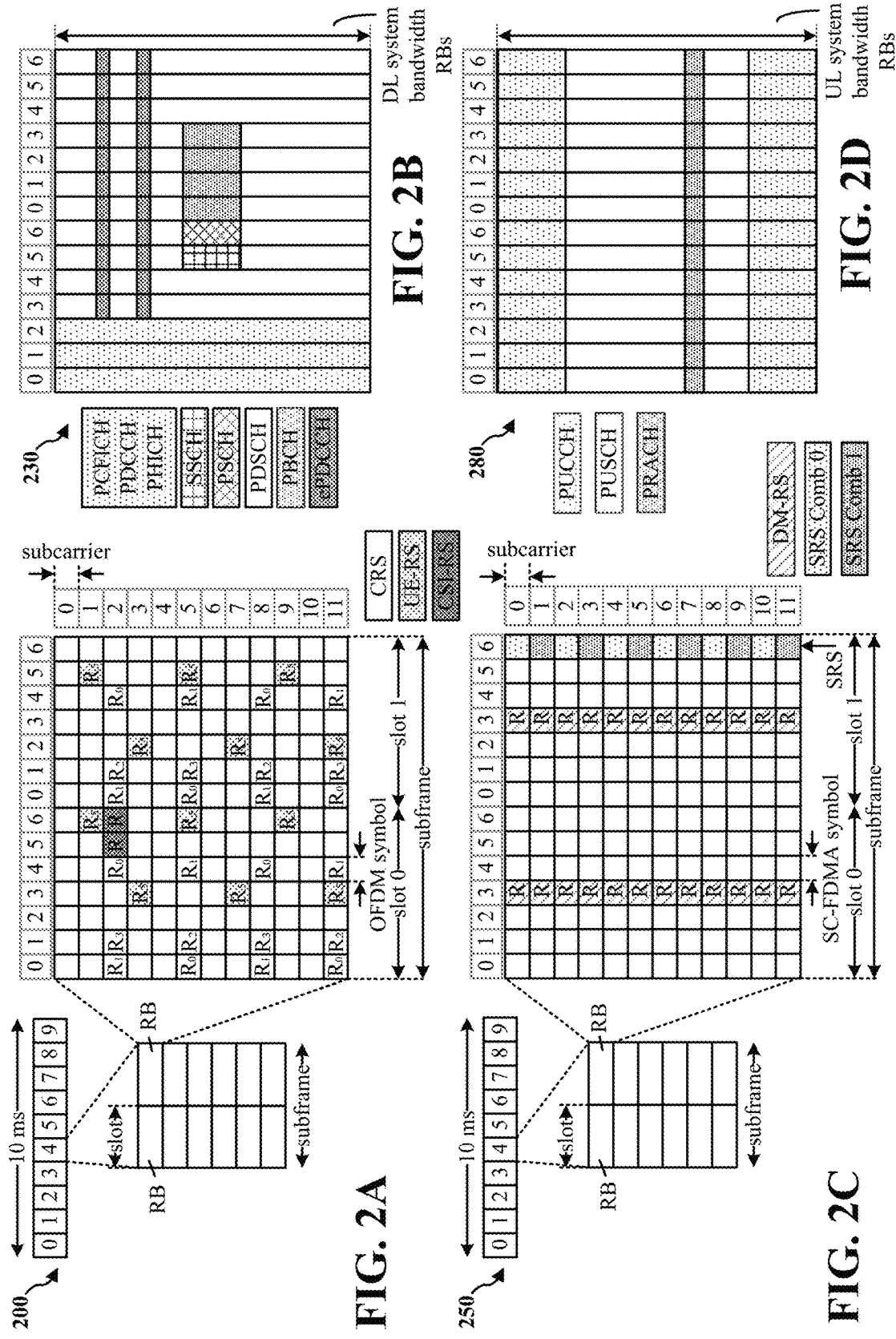
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
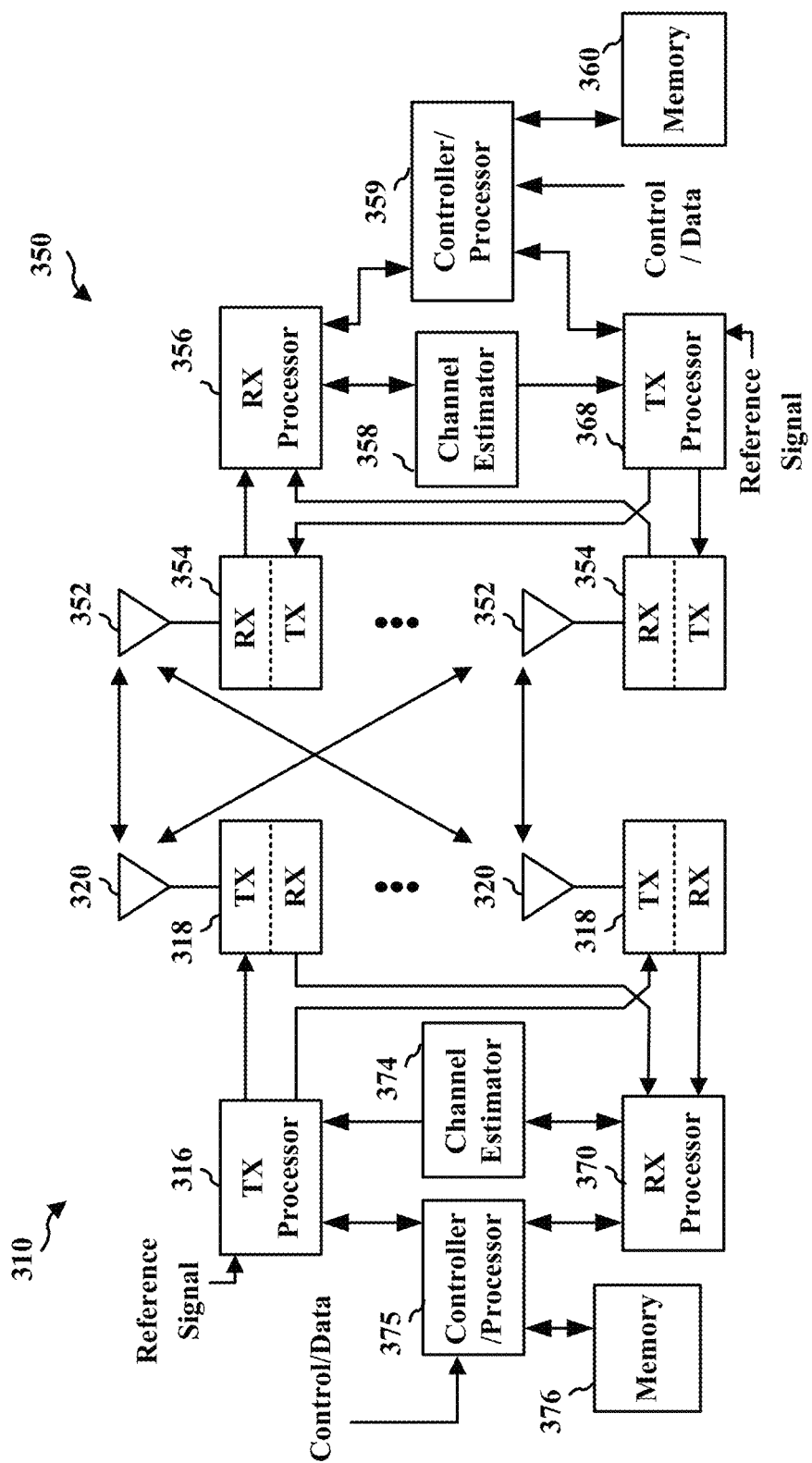
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
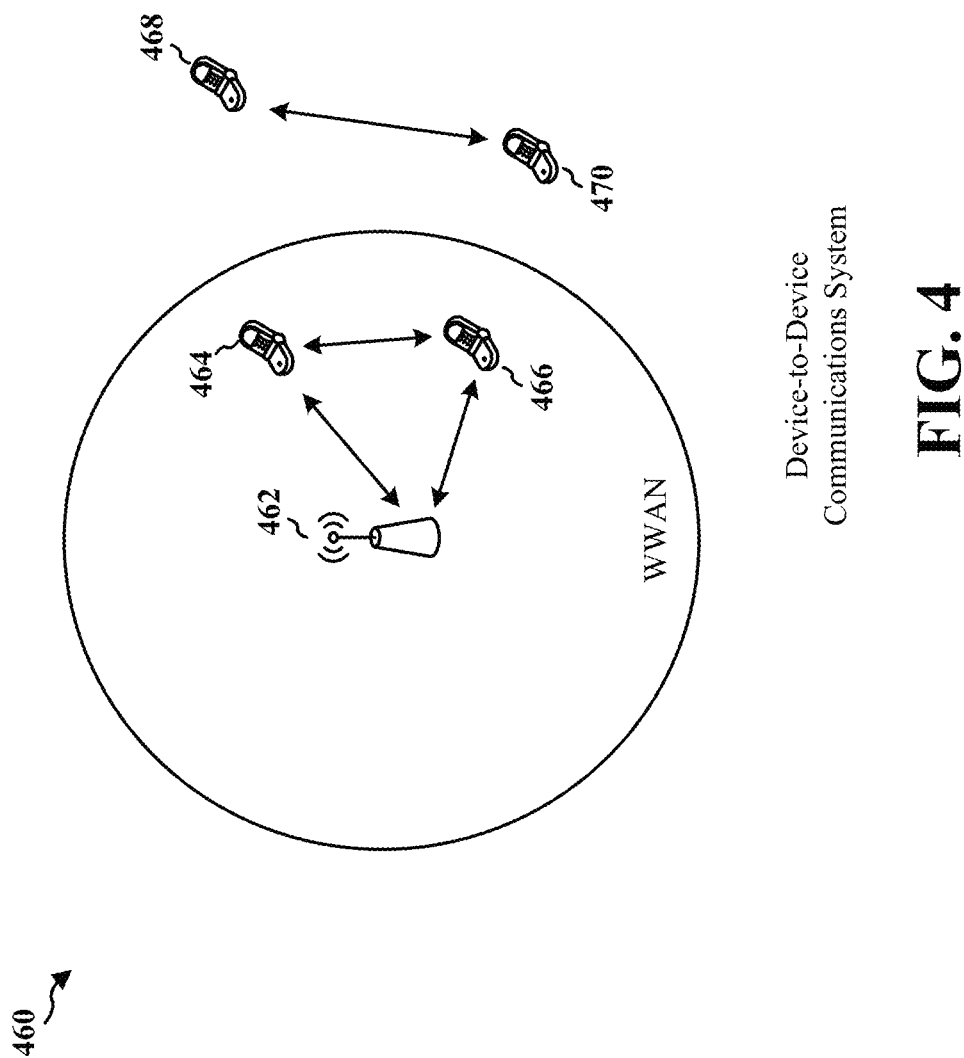
FIG. 4 is a diagram of a device-to-device communications system.

FIG. 4 is a diagram of a device-to-device (D2D) communication system 460. The D2D communication system 460 includes a plurality of UEs 464, 466, 468, 470. The D2D communication system 460 may overlap with a cellular communication system, such as for example, a WWAN. Some of the UEs 464, 466, 468, 470 may communicate together in D2D communication using the DL/UL WWAN spectrum, some of the UEs may communicate with the base station 462, and some of the UEs may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. One use for the D2D communication is a vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC provides a short-range wireless communication capability, and may be based on IEEE 802.11p that is similar to Wifi. In the DSRC, before transmission, a device may examine a channel. For transportation-related communications (e.g., V2X communication), 5.9 GHz unlicensed spectrum may be reserved for intelligent transportation services (ITS) communication. Recently, implementing other types of communication such as LTE communication for V2V communication has been under development. For example, LTE direct (LTE-D) may be utilized for V2V communication, over a licensed spectrum and/or an unlicensed spectrum.

Figure 5:
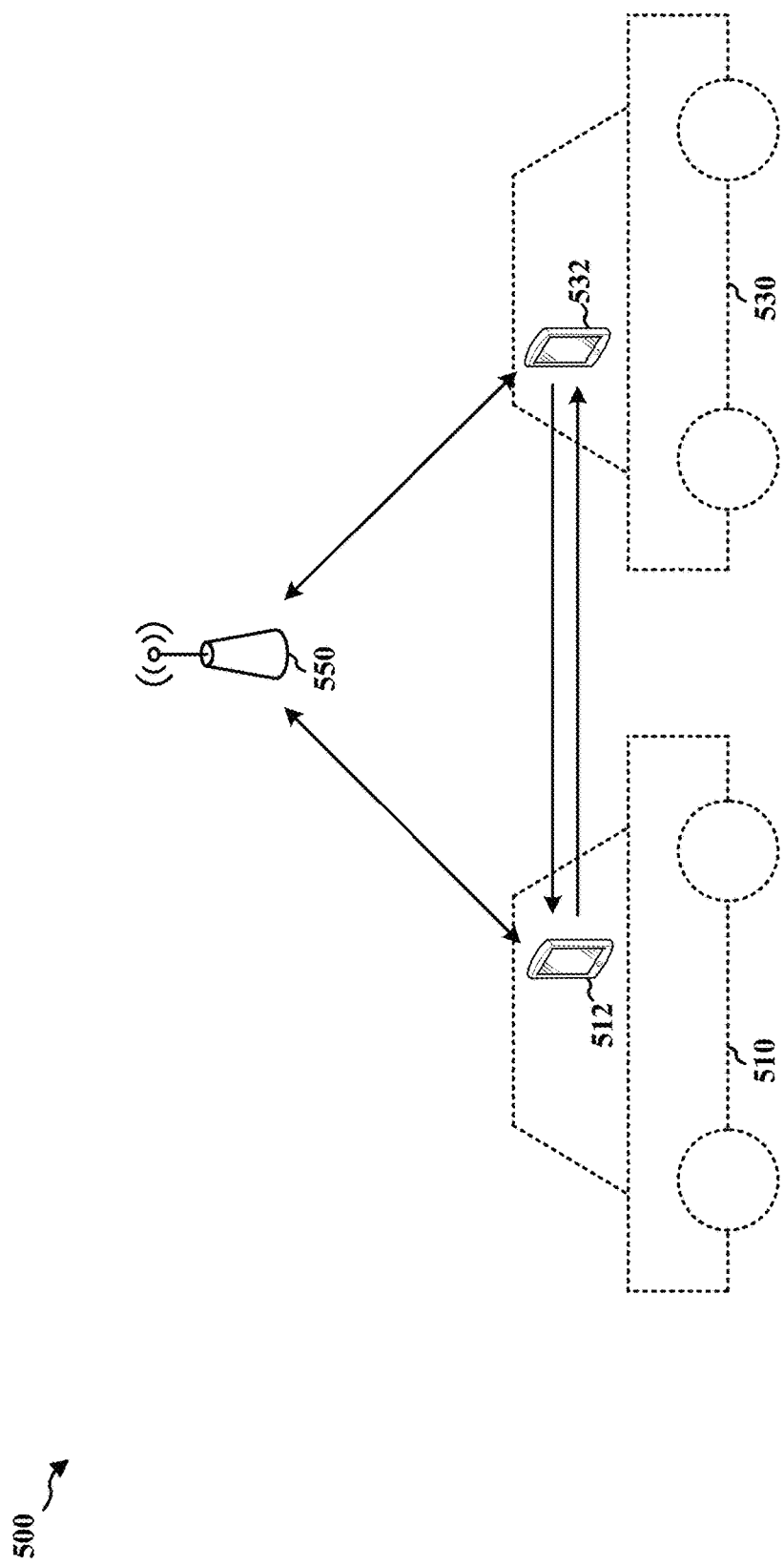
FIG. 5 is an example diagram illustrating vehicle-to-vehicle communication.

FIG. 5 is an example diagram 500 illustrating V2V communication. A first device 512 (e.g., UE 512) is present in a first vehicle 510, and thus may travel with the first vehicle 510. A second device 532 (e.g., another UE 532) may be present in a second vehicle 530. In another aspect, the first device 512 may be present independently from the first vehicle 510 or may be a part of the first vehicle 510. The second device 532 may be present independently from the second vehicle 530, or may be a part of the second vehicle 530. The first device 512 and the second device 532 may be connected to a base station 550. The first device 512 and the second device 532 are also configured to perform D2D communication with each other over LTE. The first device 512 and the second device 532 may also perform short range communication with each other using the IEEE 802.11p protocol.

LTE V2V communication may provide more reliable performance than IEEE 802.11p based V2V communication at least because the LTE V2V communication provides transmission synchronization, frequency-division modulation (FDM), and a coding gain. Sensing for available resources in a time domain and a frequency domain with semi-persistent transmissions may lead to more reliable performance for LTE V2V transmission. In particular, the device may determine which time frame (e.g., subframe) and which frequency band are occupied by another device's transmission and thus are unavailable (e.g., busy), and may determine which time frame and which frequency are idle and thus are available. Although the following discussion refers to LTE V2V communication, it is noted that the LTE V2V communication is similar to the LTE D2D communication, and thus the following discussion may also apply to LTE D2D communication.

V2V communication based on LTE (LTE V2V communication) may coexist with short range communication (e.g., DSRC based on IEEE 802.11p) in an unlicensed spectrum. The coexistence of the LTE V2V communication with the short range communication in the unlicensed spectrum may be similar to coexistence of LTE in the unlicensed spectrum with Wifi, for example, via license assisted access (LAA). For reliable coexistence of short range communication and LTE V2V (e.g., by eliminating or minimizing a collision due to presence of two means of communication on a same channel), the following criteria should be considered. The coexistence of the LTE V2V communication with the short range communication should place higher priority on the short range communication over the LTE V2V communication, and should not have an impact on the specification for the short range communication (e.g., by minimizing an impact on the short range communication protocol). The coexistence should be a long term coexistence scheme (e.g., more than a TTI-level coexistence or message-by-message level coexistence). The coexistence of LTE V2V and DSRC should also take into consideration different cases involving UEs that are able to perform both short range communication and LTE V2V communication and UEs that are able to perform either short range communication or LTE V2V communication. The coexistence should take into consideration multiple communication channels and LTE V2V UEs that may have multiple transmit and receive chains. Some UEs may not have transmit and receive chains for all channels. The coexistence should minimize changes to the current LTE V2V configuration. In addition, the short range communication and LTE V2V communication should be able to provide coverage for many devices. Thus, the coexistence approach should allow maximizing the number of vehicles/devices that can detect each other. Therefore, a coexistence approach for LTE V2V communication with short range communication which takes into consideration the above criteria is desired.

According to an aspect of the disclosure, a UE (e.g., UE 512) may determine whether short range communication (e.g., DSRC) is being performed on a particular channel in the unlicensed spectrum and may refrain from performing cellular D2D communication (e.g., LTE V2V communication) on the channel in the unlicensed spectrum when the channel occupied by short range communication. The UE may initially determine the priority level of each channel of multiple channels in the unlicensed spectrum. For LTE V2V communication, each channel of the multiple channels may be assigned a respective priority level (e.g., from a system level perspective). The UE may be configured to perform LTE V2V communication on a channel with a higher priority level rather than on a channel with a lower priority level. The eNB may indicate the priority level associated with each channel of the multiple channels (e.g., by communicating messages including priority information to the UEs), and/or the priority level of each channel of the multiple channels may be preconfigured for the UEs.

The priority levels for the channels in the unlicensed spectrum may be determined based on a region (e.g., assigned by an operator using the channels in the region) and/or may be determined randomly. Alternatively, the priority levels may be determined by UEs. For example, each UE may assign a higher priority level to a channel that is less occupied by short range communication. A UE may determine a level of short range communication on a particular channel according to a past communication history involving the particular channel, and may assign a priority level based on the level of short range communication. In one example, the UE may assign a higher priority level to a channel that has been less frequently occupied by short range communication than another channel according to the past communication history. For example, if the UE determines based on the past communication history that channel 1 was occupied by short range communication 10% of the time and channel 2 was occupied by short range communication 50% of the time, then the UE may assign a higher priority level to channel 1 than to channel 2 because channel 1 has been less frequently occupied by the short range communication than channel 2.

The UE may sense a highest priority channel (a channel with the highest priority level) of the multiple channels in the unlicensed spectrum to detect whether short range communication exists on the highest priority channel. For example, the UE may sense the highest priority channel by detecting a preamble in data received on the highest priority channel or by detecting an energy level on the highest priority channel, as described infra, to detect whether short range communication exists on the highest priority channel. The UE may be configured to sense the highest priority channel before each transmission, to detect the presence of the short range communication on the highest priority channel. The period for sensing the channel by the UE may be a function of a maximum sensing period for a short range communication and/or other short range communication parameters. The maximum sensing period may be used to detect the short range communication in order to ensure that there is no short range communication transmitter in a local area (e.g., area surrounding the UE). If the UE determines that no short range communication transmitter is present in the local area, then the UE may use the highest priority channel to transmit a LTE V2V communication. LTE V2V UEs (UEs capable of LTE V2V communication) in a local area may be able to sense that a channel is not occupied (e.g., not occupied by the short range communication), and then may transmit LTE V2V communication on the unoccupied channel. Such channel sensing may ensure that LTE V2V UEs in a local area are able to transmit and receive on the same channel, and may be useful for LTE V2V communication between UEs with a limited number of transmit and receive chains. In an aspect, if there are two or more channels with the highest priority level, then the UE may detect whether each of the channels with the highest priority level is occupied by the short range communication and may perform a LTE V2V communication on a channel with the highest priority level that is not occupied by the short range communication.

In an aspect, the UE may detect short range communication on a channel by detecting a preamble in data received on the channel and/or detecting energy on the channel. In particular, if the UE detects a preamble that indicates short range communication, the UE may determine the presence of short range communication on the channel. For example, the preamble may be at least one of a short training field, a long training field, or a reference signal portion. If the UE finds such a preamble, the UE may also determine that another UE transmitting short range communication is nearby. If the UE detects a high energy (e.g., an energy greater than an energy threshold) on the channel, then the UE may determine with a high likelihood that short range communication exists on the channel. If the UE detects a high energy on the channel and is not able to decode a V2V communication signal on the channel, the UE may determine with a higher likelihood that short range communication exists on the channel.

In an aspect, if the UE detects presence of short range communication on the highest priority channel when sensing on the highest priority channel, the UE may determine to perform short range wireless communication on the highest priority channel if the UE is capable of short range wireless communication. For example, the UE's short range communication on the highest priority channel that is occupied by a second short range communication may not cause collision because the UE's short range communication is the same type of communication as the second short range communication present in the highest priority channel. In an aspect, if the UE detects the presence of short range communication on the highest priority channel when sensing on the highest priority channel, then the UE may determine whether other channels are available for LTE V2V communication (e.g., if the UE is attempting to perform LTE V2V communication). If no other channels are available for LTE V2V communication, the UE may refrain from performing LTE V2V communication.

If other channels are available for LTE V2V communication and not occupied by short range communication, the UE may perform LTE V2V communication using one of the other channels available for LTE V2V communication. In particular, to perform LTE V2V communication, the UE may utilize a channel (of the other channels) with the highest priority level among the other channels available for LTE V2V communication (e.g., and not occupied by short range communication). Thus, in one example, from the other channels, the UE may select a channel with the highest priority level of the other channels that are available for LTE V2V communication and are not occupied by short range communication, and perform LTE V2V communication using the selected channel. For example, if the highest priority channel is occupied by short range communication and a second highest priority channel with the second highest priority level is available for LTE V2V communication, the UE may shift LTE V2V communication usage from the highest priority channel to the second highest priority channel. In an aspect, UEs within the same local area (e.g., same cell area) may shift LTE V2V communication usage to the second highest priority channel if the highest priority channel is occupied by short range communication. All LTE V2V UEs within the same local area may be synchronized such that all LTE V2V UEs may be capable of determining whether a certain channel is occupied by short range communication. For example, if channel 1 having the highest priority level is occupied by short range communication, all the LTE V2V UEs may utilize channel 2 having the next highest priority level to perform LTE V2V communication, provided that channel 2 is not occupied by short range communication.

If all of the UEs within the same local area shift the LTE V2V communication usage to a new channel (e.g., the second highest priority channel), then the UE may assume that information such as the interference pattern, semi-persistent scheduling (SPS) characteristics, and scheduling assignment (SA) decoding information will be carried over from a prior channel (e.g., the highest priority channel) to the new channel (e.g., the second highest priority channel). When the UE shifts to a new channel (e.g., the second highest priority channel), the UE may use such information in the new channel. The UE may additionally consider a new interference pattern observed in the new channel during LTE V2V communication on the new channel.

In a case where the UE detects the presence of short range communication on the highest priority channel and other channels are available for LTE V2V communication, if the UE in addition has short range communication capability, then the UE may perform short range communication on the highest priority channel, in addition to performing LTE V2V communication on another channel (e.g., the second highest priority channel) available for LTE V2V communication (e.g., in the unlicensed spectrum). As such, the UE may perform both the short range communication and the LTE V2V communication at the same time. The UE may consider any RF limitations on the highest priority channel before performing short range communication on the highest priority channel. If the UE detects the presence of short range communication on the highest priority channel and no other channels are available for LTE V2V communication (e.g., e.g., in the unlicensed spectrum), then the UE may not perform LTE V2V communication. If the UE does not have short range communication capability, the UE may perform the LTE V2V on a channel available for LTE V2V communication, without performing short range communication.

If the UE does not detect the presence of short range communication on the highest priority channel, the UE (and other UEs in the local area) may utilize the highest priority channel for LTE V2V communication. If the UE does not detect the presence of short range communication on the highest priority channel, the UE may still attempt to detect the presence of short range communication on another channel. Thus, if the UE does not detect presence of short range communication on the highest priority channel and the UE has short range communication capability (e.g., short range communication modem), the UE with the short range communication capability may search for channels occupied by short range communication (e.g., and/or for channels available for short range communication) in channels other than the highest priority level channel. If the UE does not detect presence of short range communication on the highest priority channel and finds a channel occupied by short range communication, the UE may perform short range communication on the channel occupied by the short range communication (e.g., DSRC-occupied channel) and may perform LTE V2V communication on the highest priority channel. The UE may perform short range communication on the channel already occupied by short range communication such that the UE may not occupy an additional channel with the UE's short range communication. If the UE does not detect presence of short range communication on any of the channels, the UE may perform LTE V2V communication on the highest priority channel and may perform short range communication on a channel that is not occupied by LTE V2V communication. For example, if the UE does not detect presence of short range communication on any of the channels, the UE may perform LTE V2V communication on the highest priority channel and the UE may perform short range communication on a channel with a highest priority among channels that are not occupied by LTE V2V communication.

The UE (and other UEs in the local area) may consider shifting LTE V2V communication back to a higher priority channel. For example, after the UE shifts LTE V2V communication by the UE from the highest priority channel to a lower priority channel (e.g., due to presence of short range communication on the highest priority channel), the UE may consider shifting LTE V2V communication back to the highest priority channel based on changed conditions on the channels. For example, the conditions may change such that the highest priority channel may no longer be occupied by the short range communication. Before shifting LTE V2V communication back to a higher priority channel, the UE checks for changed conditions by sensing whether the higher priority channel is occupied by short range communication or not. A channel occupied by short range communication may be occupied by short range communication from a UE without LTE V2V capability and/or by short range communication from a UE with LTE V2V capability.

According to an aspect of the disclosure, the UE may distinguish between short range communication from another UE without LTE V2V capability and short range communication from another UE with LTE V2V capability. In order to determine whether the channel is occupied by short range communication from a UE without LTE V2V capability or from a UE with LTE V2V capability, the UE may periodically employ a silence period during which a UE with LTE V2V capability does not transmit short range communication. The length of the silence period may be a function of short range communication parameters including maximum length of short range transmission and a maximum sensing period. LTE V2V UEs may sense the higher priority channel during the silence period and check whether short range communication from a UE without LTE V2V capability exists on the higher priority channel. Because a UE with LTE V2V capability does not transmit short range communication during the silence period, the UE may determine that some other UE without LTE V2V capability is transmitting short range communication during the silence period if the UE senses presence of a short range communication during the silence period.

If the UE that has LTE V2V capability determines that no UE without LTE V2V capability transmits on the higher priority channel, the UE may perform the LTE V2V communication on the higher priority channel. For example, if the UE determines that no UE without LTE V2V capability transmits on the higher priority channel, the UE may assume that the higher priority channel is not occupied by the short range communication, and thus LTE V2V communication using the higher priority channel may be done, even if a UE with LTE V2V capability transmits a short range communication on the higher priority channel. On the other hand, for example, if the UE determines that a UE without LTE V2V capability transmits on the higher priority channel, the UE may assume that the higher priority channel is occupied by a short range communication, and thus may not perform LTE V2V communication on the higher priority channel. In one example, if the UE determines that no UE without LTE V2V capability transmits on the higher priority channel, the UE with LTE V2V capability (e.g., and other UEs with LTE V2V capability) may shift the LTE V2V communication back to the higher priority channel (e.g., and may stop transmitting short range communication on the higher priority channel).

When the UE shifts the LTE V2V communication to the higher priority channel, the UE may assume that information such as the interference pattern, SPS characteristics, and SA decoding information will be carried over from a prior channel (e.g., lower priority channel) to the higher priority channel, where the priori channel is a channel before switching to the higher priority channel. When the UE shifts to the higher priority channel, the UE may use such information (e.g., the SPS characteristics and/or SA decoding information) on the higher priority channel. The UE may additionally consider new interference pattern on the higher priority channel during LTE V2V communication on the higher priority channel.

Figure 6:
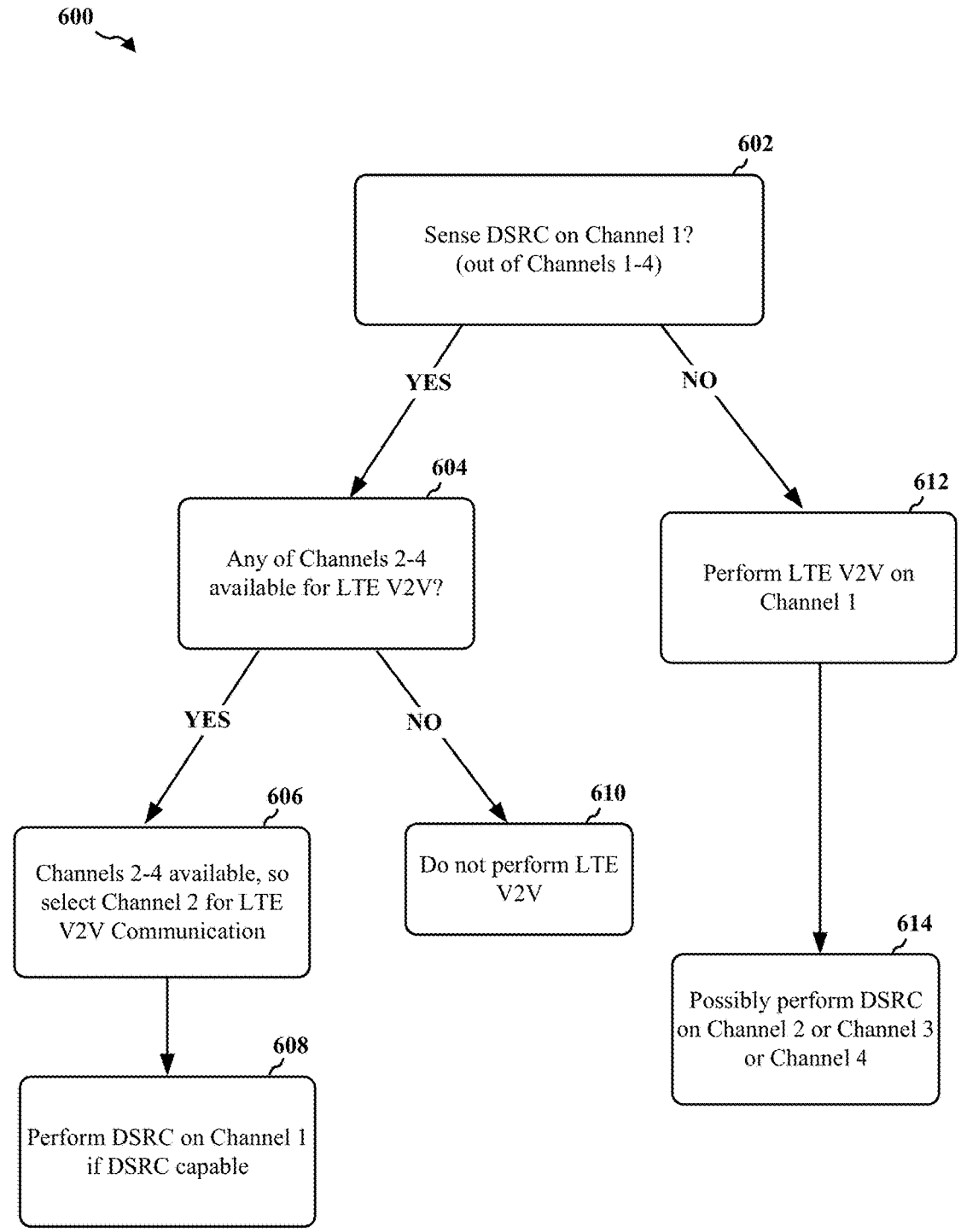
FIG. 6 is an example flow diagram illustrating an aspect of the disclosure.

FIG. 6 is an example flow diagram 600 illustrating an aspect of the disclosure. In the example flow diagram, the UE initially determines priority levels of the channels, where Channels 1, 2, 3, and 4 have priority levels 1, 2, 3, and 4, respectively. At 602, the UE senses whether DSRC is performed on Channel 1, the channel with the highest priority out of Channels 1-4. If the UE senses DSRC on Channel 1, the UE determines whether any of Channels 2-4 are available for LTE V2V communication. If Channels 2-4 are available for LTE V2V communication, at 606, the UE selects Channel 2 for LTE V2V communication because Channel 2 has the highest priority level among Channels 2-4. Thus, the UE may perform LTE V2V communication using Channel 2. The UE may also perform DSRC on Channel 1, at 608, if the UE has DSRC capability.

If the UE at 602 senses no DSRC on Channel 1, the UE performs LTE V2V on Channel 1, at 612. The UE may possibly perform DSRC on one or more of Channels 2-4, at 614.

Figure 7:
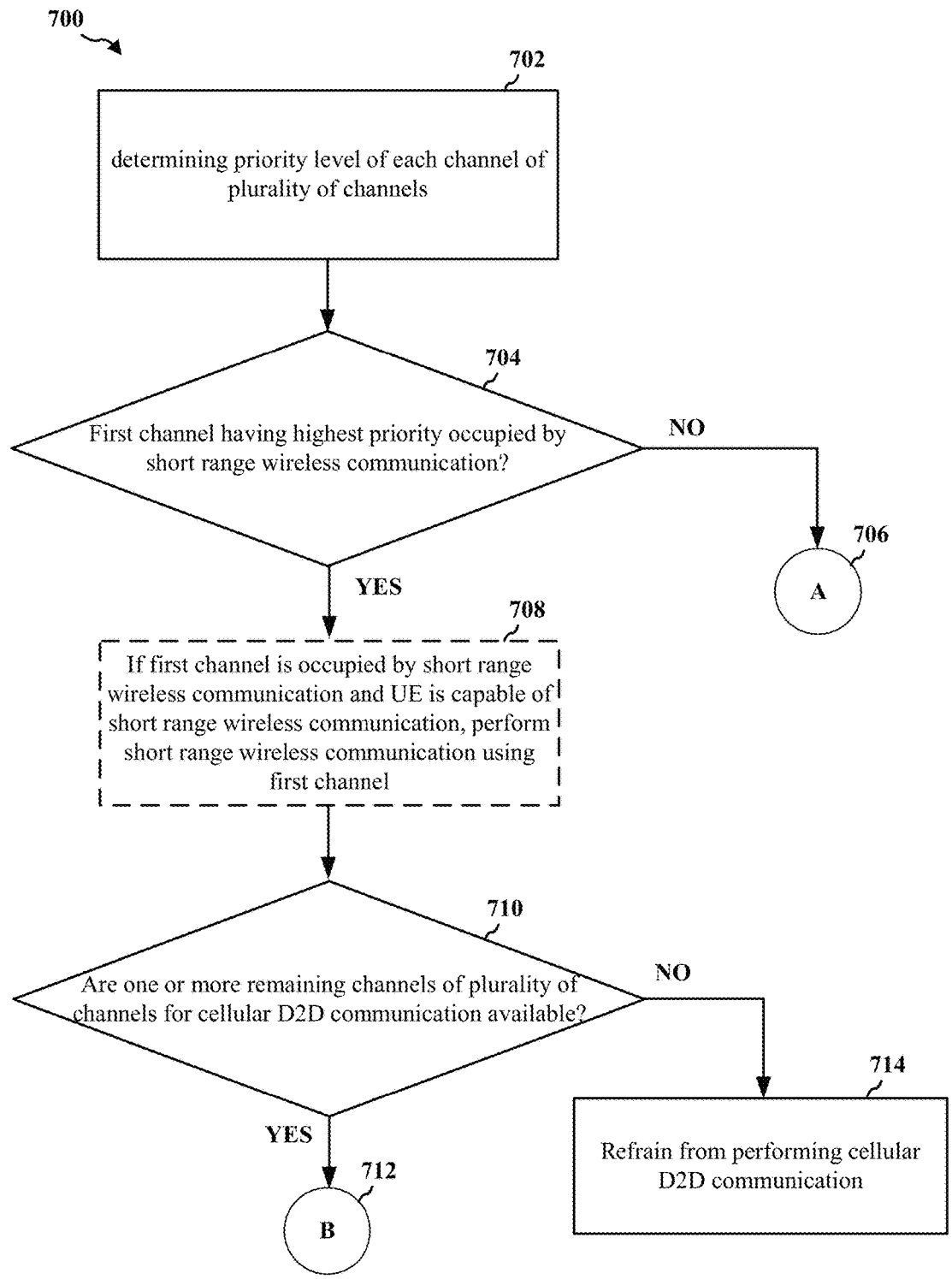
FIG. 7 is a flowchart of a method of wireless communication.

FIG. 7 is a flowchart 700 of a method of wireless communication. The method may be performed by a UE (e.g., the UE 512, the apparatus 1002/1002'). At 702, the UE determine a priority level of each channel of a plurality of channels. For example, as discussed supra, the UE initially determines the priority levels of multiple channels, where for LTE V2V communication, each channel of the multiple channels may be assigned with a respective priority level.

At 704, the UE determines whether a first channel of the plurality of channels, the first channel having a highest priority level, is occupied by short range wireless communication. For example, as discussed supra, the UE may sense a highest priority channel (a channel with the highest priority level) of the multiple channels to detect whether short range communication exists on the highest priority channel. In an aspect, the UE may determine whether the first channel is occupied by short range wireless communication by sensing for short range wireless communication based on at least one of a preamble received in the first channel indicating presence of the short range wireless communication, or an energy level in the first channel exceeding a threshold. For example, as discussed supra, the UE may detect short range communication on a channel by detecting a preamble in data received on the channel and/or detecting energy (e.g., an energy greater than an energy threshold) on the channel. In an aspect, the UE may determine whether the first channel is occupied by short range wireless communication by: determining whether the short range wireless communication in the first channel is transmitted by a UE without cellular D2D capability, if the short range wireless communication in the first channel is transmitted by a UE without cellular D2D capability, determining that the first channel is occupied by short range wireless communication, and if the short range wireless communication in the first channel is transmitted by a UE with cellular D2D capability and is not transmitted by a UE without cellular D2D capability, determining that the first channel is not occupied by short range wireless communication. For example, as discussed supra, if the UE determines that no UE without LTE V2V capability transmits on the higher priority channel, the UE may assume that the higher priority channel is not occupied by the short range communication, and thus may allow LTE V2V communication on the higher priority channel, even if a UE with LTE V2V capability transmits a short range communication on the higher priority channel. On the other hand, for example, as discussed supra, if the UE determines that a UE without LTE V2V capability transmits on the higher priority channel, the UE may assume that the higher priority channel is occupied by the short range communication, and thus may not allow LTE V2V communication on the higher priority channel.

In an aspect, the UE may determine whether the short range wireless communication in the first channel is transmitted by a UE without cellular D2D capability by determining whether a UE without cellular D2D capability transmits short range wireless communication in the first channel during a silence period, where no UE with cellular D2D capability is configured to perform short range wireless communication in the first channel during the silence period, where one or more UEs including the UE may be configured to perform cellular D2D communication in the first channel if a UE without cellular D2D capability during a silence period does not transmit short range wireless communication in the first channel. For example, as discussed supra, in order to determine whether the channel is occupied by short range communication from a UE without LTE V2V capability or from a UE with LTE V2V capability, the UE may periodically employ a silence period during which a UE with LTE V2V capability does not transmit short range communication. For example, as discussed supra, if the UE determines that no UE without LTE V2V capability transmits on the higher priority channel (e.g., during the silence period), UEs with LTE V2V capability may shift the LTE V2V communication back to the higher priority channel to perform the LTE V2V communication in the higher priority channel. In such an aspect, the cellular D2D communication may be performed in the first channel based on at least one of a interference pattern, SPS characteristics, or SA decoding information carried from previous use of a previous channel. For example, as discussed supra, when the UE shifts the LTE V2V communication to the higher priority channel, the UE may assume that information such as the interference pattern, SPS characteristics, and SA decoding information will be carried over from a previous channel (e.g., lower priority channel) to the higher priority channel, and may use this information (e.g., the SPS characteristics and/or SA decoding information) on the higher priority channel.

If the first channel is not occupied by the short range wireless communication, the UE may perform features described infra at 706. On the other hand, in an aspect, if the first channel is occupied by the short range wireless communication and the UE is capable of short range wireless communication, at 708, the UE may perform short range wireless communication using the first channel. For example, as discussed supra, if the UE detects presence of short range communication on the highest priority channel when sensing on the highest priority channel, the UE may determine to perform short range wireless communication on the highest priority channel if the UE is capable of short range wireless communication. If the first channel is occupied by the short range wireless communication, at 710, the UE determines availability of one or more remaining channels of the plurality of channels for cellular D2D communication, where the one or more remaining channels are different from the first channel. For example, as discussed supra, if the UE detects presence of short range communication on the highest priority channel when sensing on the highest priority channel, then the UE may determine whether other channels are available for LTE V2V communication. If the UE determines at least one of the one or more remaining channels is available for cellular D2D communication, the UE may perform features as described infra, at 712. If none of the one or more remaining channels is available for cellular D2D communication, at 714, the UE refrains from performing cellular D2D communication. For example, as discussed supra, if no other channels are available for LTE V2V communication, the UE may refrain from performing LTE V2V communication.

In an aspect, the cellular D2D communication may be cellular V2V communication. For example, as discussed supra, LTE V2V communication may be used for cellular D2D communication. In an aspect, the short range wireless communication may be a DSRC. In an aspect, the short range wireless communication may be based on IEEE 802.11p. For example, as discussed supra, the DSRC provides a short-range wireless communication capability, typically based on IEEE 802.11p that is similar to Wifi. In an aspect, the priority level of each channel of the plurality of channels is indicated by a base station or is preconfigured in the UE. For example, as discussed supra, the eNB may indicate the priority levels for the channels (e.g., by communicating messages including priority information to the UEs), and/or the priority levels may be preconfigured for the UEs.

Figure 8:
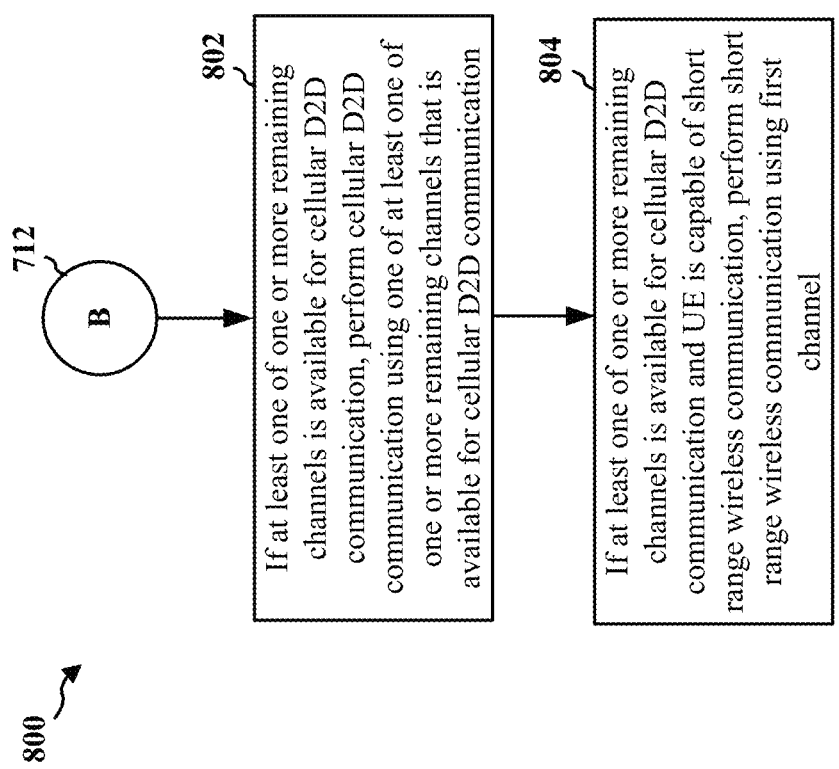
FIG. 8 is a flowchart of a method of wireless communication, expanding from the flowchart of FIG. 7.

FIG. 8 is a flowchart 800 of a method of wireless communication, expanding from the flowchart 700 of FIG. 7. The method may be performed by a UE (e.g., the UE 512, the apparatus 1002/1002'). The flowchart 800 continues from 712 in the flowchart 700 of FIG. 7 if the UE determines at least one of the one or more remaining channels is available for cellular D2D communication. At 802, if at least one of the one or more remaining channels is available for the cellular D2D communication, the UE performs the cellular D2D communication using one of the at least one of the one or more remaining channels that is available for the cellular D2D communication. In an aspect, a priority level of the one of the at least one of the one or more remaining channels is the highest among priority levels of the one or more remaining channels. For example, as discussed supra, if other channels are available for LTE V2V communication (e.g., and not occupied by short range communication), the UE may perform LTE V2V communication using one of the channels available for LTE V2V communication. For example, as discussed supra, to perform LTE V2V communication, the UE may utilize a channel (of the other channels) with the highest priority level among the other channels available for LTE V2V communication (e.g., and not occupied by short range communication). In an aspect, the UE may perform the cellular D2D communication using one of the at least one of the one or more remaining channels that is available for the cellular D2D communication by performing the cellular D2D communication using the one of the at least one of the one or more remaining channels based on at least one of a interference pattern, SPS characteristics, or SA decoding information from previous use of the first channel. For example, as discussed supra, if all of the UEs within the same local area shift the LTE V2V communication usage to a new channel (e.g., the second highest priority channel), then the UE may assume that information such as the interference pattern, SPS characteristics, and SA decoding information will be carried over from a prior channel (e.g., the highest priority channel) to the new channel (e.g., the second highest priority channel). In an aspect, the cellular D2D communication using one of the at least one of the one or more remaining channels that is available for the cellular D2D communication may be performed when the UE is not capable of short range wireless communication. For example, as discussed supra, if the UE does not have short range communication capability, the UE may perform the LTE V2V on a channel available for LTE V2V communication, without performing short range communication. In an aspect, the UE may perform the cellular D2D communication using one of the at least one of the one or more remaining channels that is available for the cellular D2D communication by performing the cellular D2D communication using a second channel with a highest priority level of the at least one of the one or more remaining channels that is available for the cellular D2D communication. For example, as discussed supra, to perform LTE V2V communication, the UE may utilize a channel with the highest priority level among the channels available for LTE V2V communication.

At 804, if the at least one of the one or more remaining channels is available for cellular D2D communication and the UE is capable of short range wireless communication, the UE performs short range wireless communication using the first channel. For example, as discussed supra, in a case where the UE detects presence of short range communication on the highest priority channel and other channels are available for LTE V2V communication, if the UE in addition has short range communication capability, then the UE continues to perform short range communication on the highest priority channel.

FIG. 9A is a flowchart 900 of a method of wireless communication, expanding from the flowchart 700 of FIG. 7. The method may be performed by a UE (e.g., the UE 512, the apparatus 1002/1002'). The flowchart 900 continues from 706 in the flowchart 700 of FIG. 7 if the first channel is not occupied by the short range wireless communication. If the first channel is not occupied by the short range wireless communication, at 902, the UE performs cellular D2D communication using the first channel. For example, as discussed supra, if the UE does not detect presence of short range communication on the highest priority channel, the UE (and other UEs in the local area) may utilize the highest priority channel for LTE V2V communication.

FIG. 9B is a flowchart 950 of a method of wireless communication, expanding from the flowchart 700 of FIG. 7. The method may be performed by a UE (e.g., the UE 512, the apparatus 1002/1002'). The flowchart 900 continues from 706 in the flowchart 700 of FIG. 7 if the first channel is not occupied by the short range wireless communication. If the first channel is not occupied by the short range wireless communication, at 952, the UE determines whether at least one of the one or more remaining channels is occupied by short range wireless communication. For example, as discussed supra, if the UE does not detect presence of short range communication on the highest priority channel, the UE with short range communication capability (e.g., short range communication modem) may search for channels occupied by short range communication (e.g., and/or for channels available for short range communication) in channels other than the highest priority level channel. If at least one of the one or more remaining channels is occupied by short range wireless communication and the UE is capable of short range wireless communication, at 954, the UE performs short range wireless communication using the at least one of the one or more remaining channels. For example, as discussed supra, if the UE finds a channel occupied by short range communication, the UE may perform short range communication in the channel occupied by the short range communication (e.g., DSRC-occupied channel) (e.g., and may perform LTE V2V communication on the highest priority channel). In an aspect, determining (e.g., by the UE) whether at least one of the one or more remaining channels is occupied by short range wireless communication may be performed if the UE has short range wireless communication capability. For example, as discussed supra, if the UE does not detect presence of short range communication on the highest priority channel and the UE has short range communication capability, the UE with the short range communication capability may search for channels occupied by short range communication (e.g., and/or for channels available for short range communication) in channels other than the highest priority level channel.

Figure 10:
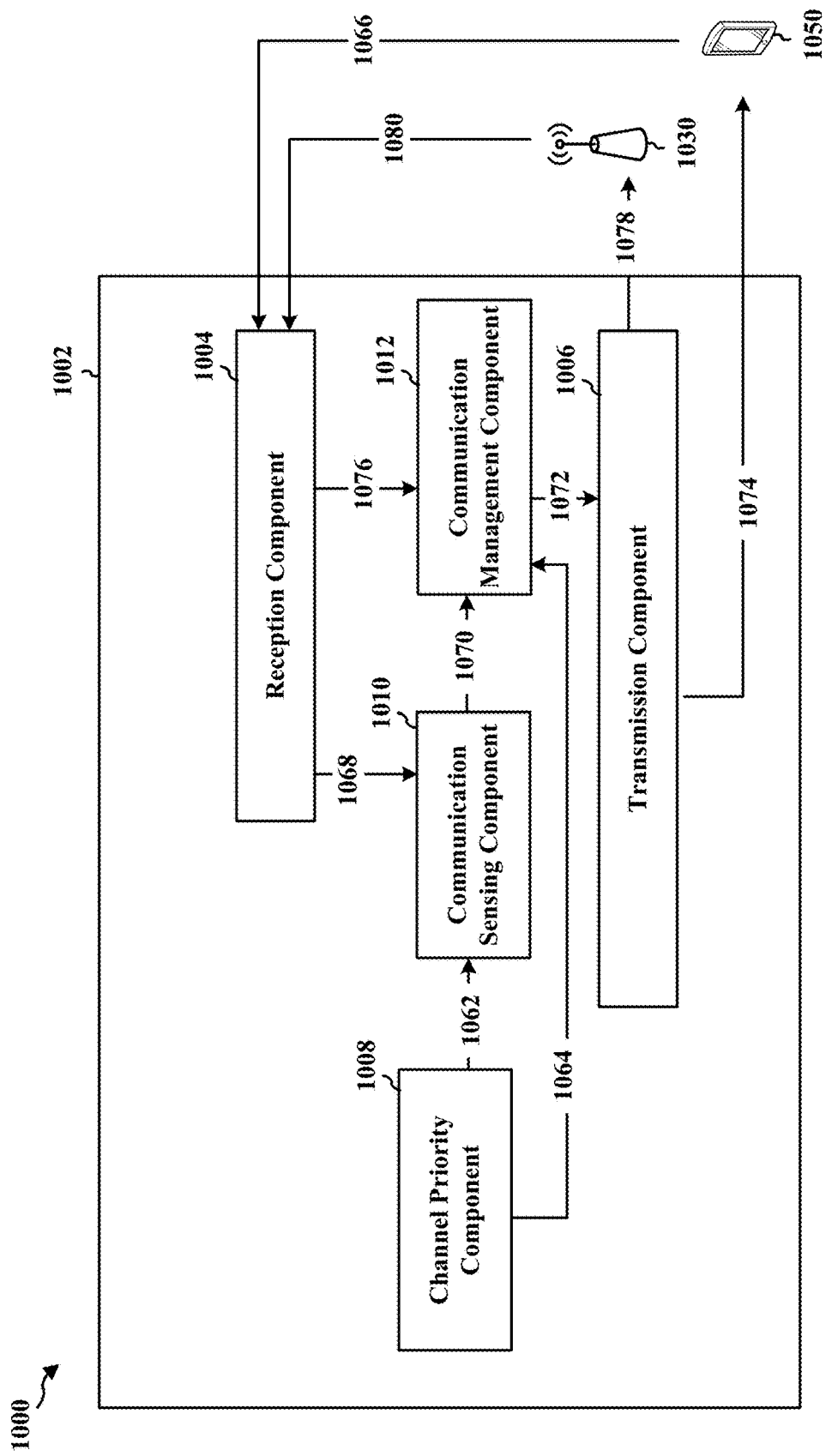
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes a reception component 1004, a transmission component 1006, a channel priority component 1008, a communication sensing component 1010, a communication management component 1012.

The channel priority component 1008 determine a priority level of each channel of a plurality of channels. The channel priority component 1008 may forward information about the priority level to the communication sensing component 1010 at 1062 and to the communication management component 1012 at 1064. The communication sensing component 1010 determines whether a first channel of the plurality of channels, the first channel having a highest priority level, is occupied by short range wireless communication, via the reception component 1004, (e.g., at 1066 and 1068), and may forward the result of the determination to the communication management component 1012 at 1070. In an aspect, the communication sensing component 1010 may determine whether the first channel is occupied by short range wireless communication by sensing for short range wireless communication based on at least one of a preamble received in the first channel indicating presence of the short range wireless communication, or an energy level in the first channel exceeding a threshold. In an aspect, the communication sensing component 1010 may determine whether the first channel is occupied by short range wireless communication by: determining whether the short range wireless communication in the first channel is transmitted by a UE without cellular D2D capability, if the short range wireless communication in the first channel is transmitted by a UE without cellular D2D capability, determining that the first channel is occupied by short range wireless communication, and if the short range wireless communication in the first channel is transmitted by a UE with cellular D2D capability and is not transmitted by a UE without cellular D2D capability, determining that the first channel is not occupied by short range wireless communication. In an aspect, the communication sensing component 1010 determines whether the short range wireless communication in the first channel is transmitted by a UE without cellular D2D capability by determining whether a UE without cellular D2D capability transmits short range wireless communication in the first channel during a silence period, wherein no UE with cellular D2D capability is configured to perform short range wireless communication in the first channel during the silence period, where one or more UEs including the UE are configured to perform cellular D2D communication in the first channel if a UE without cellular D2D capability during a silence period does not transmit short range wireless communication in the first channel. In such an aspect, the cellular D2D communication is performed in the first channel based on at least one of a interference pattern, SPS characteristics, or SA decoding information carried from previous use of a previous channel.

If the first channel is occupied by the short range wireless communication and the UE is capable of short range wireless communication, the communication management component 1012 may perform short range wireless communication using the first channel, via the transmission component 1006 and the reception component 1004 (e.g., with another UE 1050 at 1072, 1074, 1066, and 1076). The transmission component 1006 and the reception component 1004 may be configured to communicate with a base station 1030, at 1078 and 1080. If the first channel is occupied by the short range wireless communication, the communication management component 1012 determines availability of one or more remaining channels of the plurality of channels for cellular D2D communication, wherein the one or more remaining channels are different from the first channel. If none of the one or more remaining channels is available for cellular D2D communication, at 714, the communication management component 1012 refrains from performing cellular D2D communication.

In an aspect, the cellular D2D communication is cellular V2V communication. In an aspect, the short range wireless communication is a DSRC. In an aspect, the short range wireless communication is based on IEEE 802.11p. In an aspect, the priority level of each channel of the plurality of channels is indicated by a base station or is preconfigured in the UE.

If at least one of the one or more remaining channels is available for the cellular D2D communication, the communication management component 1012 performs the cellular D2D communication using one of the at least one of the one or more remaining channels that is available for the cellular D2D communication, via the transmission component 1006 and the reception component 1004 (e.g., at 1072, 1074, 1066, and 1076). In an aspect, the UE may perform the cellular D2D communication using one of the at least one of the one or more remaining channels that is available for the cellular D2D communication by performing the cellular D2D communication using the one of the at least one of the one or more remaining channels based on at least one of a interference pattern, SPS characteristics, or SA decoding information from previous use of the first channel. In an aspect, a priority level of the one of the at least one of the one or more remaining channels is the highest among priority levels of the one or more remaining channels. In an aspect, the cellular D2D communication using one of the at least one of the one or more remaining channels that is available for the cellular D2D communication is performed when the UE is not capable of short range wireless communication. In an aspect, the UE may perform the cellular D2D communication using one of the at least one of the one or more remaining channels that is available for the cellular D2D communication by performing the cellular D2D communication using a second channel with a highest priority level of the at least one of the one or more remaining channels that is available for the cellular D2D communication.

If the at least one of the one or more remaining channels is available for the cellular D2D communication and the UE is capable of short range wireless communication, the communication management component 1012 performs short range wireless communication using the first channel, via the transmission component 1006 and the reception component 1004 (e.g., at 1072, 1074, 1066, and 1076).

In an aspect, if the first channel is not occupied by the short range wireless communication, the communication management component 1012 performs cellular D2D communication using the first channel, via the transmission component 1006 and the reception component 1004 (e.g., at 1072, 1074, 1066, and 1076).

In an aspect, if the first channel is not occupied by the short range wireless communication, the communication sensing component 1010 determines whether at least one of the one or more remaining channels is occupied by short range wireless communication. If at least one of the one or more remaining channels is occupied by short range wireless communication and the UE is capable of short range wireless communication, the communication management component 1012 performs short range wireless communication using the at least one of the one or more remaining channels, via the transmission component 1006 and the reception component 1004 (e.g., at 1072, 1074, 1066, and 1076). In an aspect, the communication sensing component 1010 may determine whether at least one of the one or more remaining channels is occupied by short range wireless communication if the UE has short range wireless communication capability.

Figure 9:
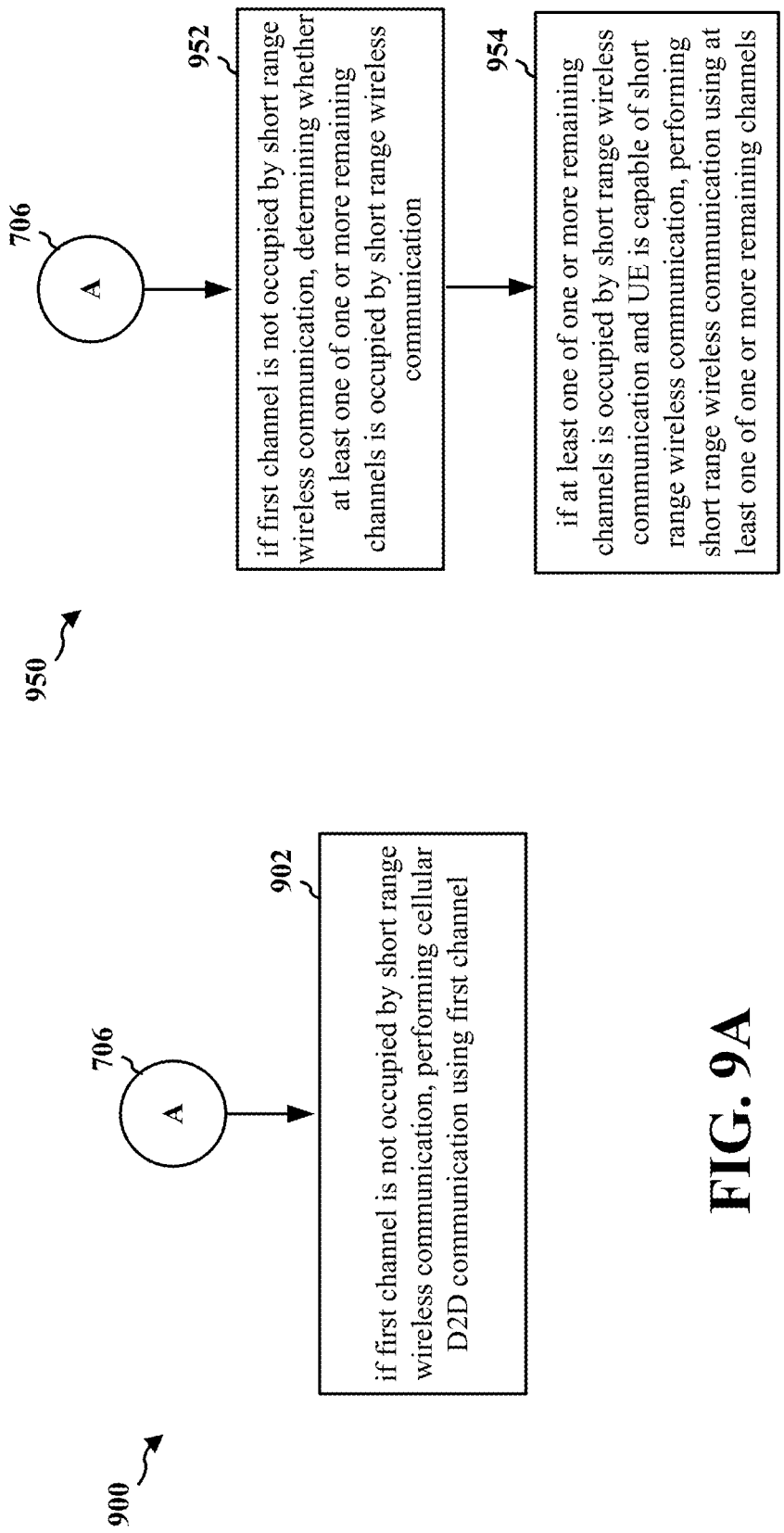
FIG. 9A is a flowchart of a method of wireless communication, expanding from the flowchart of FIG. 7.
FIG. 9B is a flowchart of a method of wireless communication, expanding from the flowchart of FIG. 7.

The apparatus may include additional components that perform each of the blocks of the algorithm in the aforementioned flowcharts of FIGS. 7-9. As such, each block in the aforementioned flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
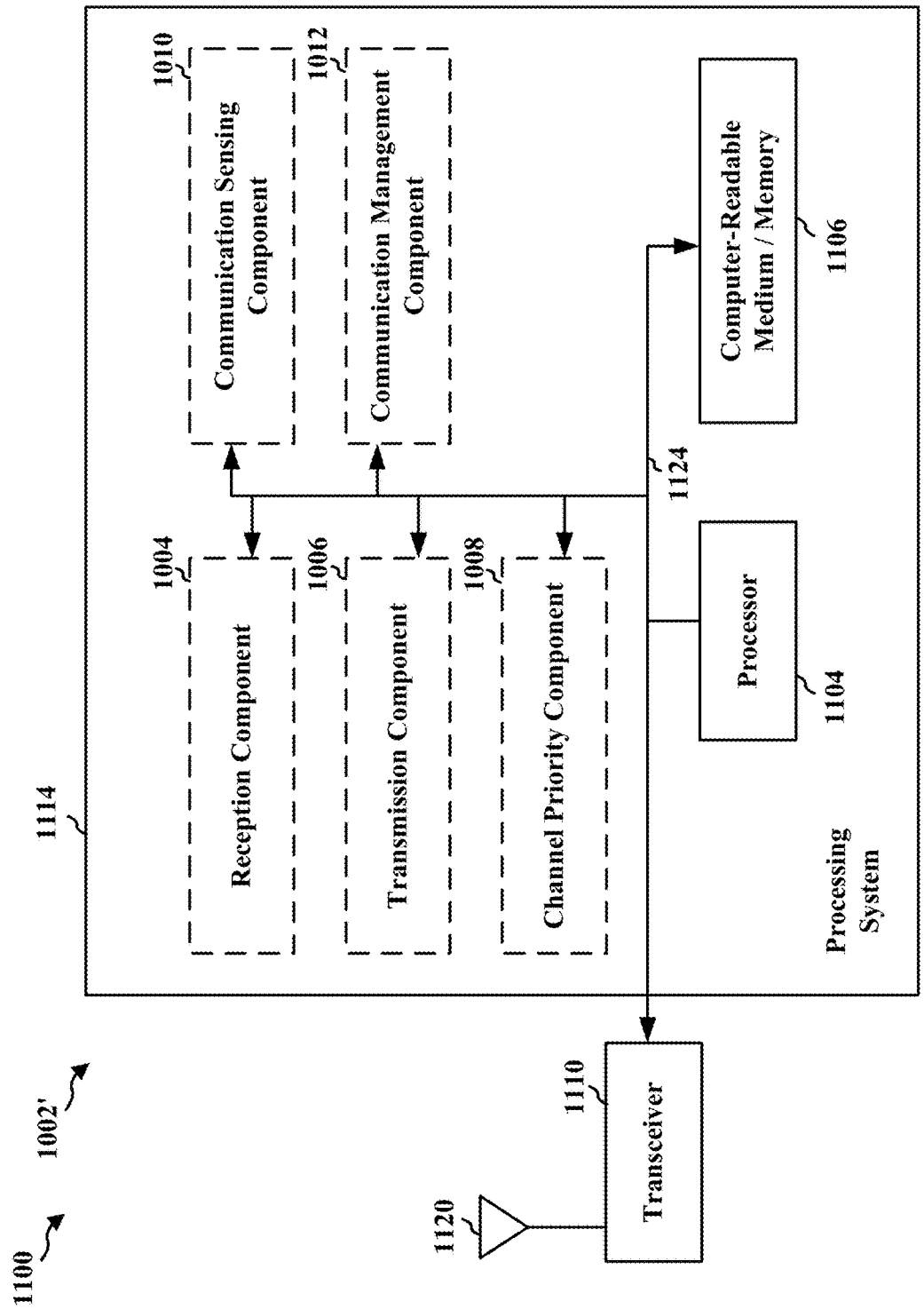
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining a priority level of each channel of a plurality of channels, means for determining whether a first channel of the plurality of channels, the first channel having a highest priority level, is occupied by short range wireless communication, and means for determining availability of one or more remaining channels of the plurality of channels for cellular D2D communication if the first channel is occupied by the short range wireless communication, wherein the one or more remaining channels are different from the first channel. In an aspect, the apparatus 1002/1002' includes means for performing the cellular D2D communication using one of the at least one of the one or more remaining channels that is available for the cellular D2D communication if at least one of the one or more remaining channels is available for the cellular D2D communication. In such an aspect, the means for performing the cellular D2D communication using one of the at least one of the one or more remaining channels that is available for the cellular D2D communication is configured to perform the cellular D2D communication using the one of the at least one of the one or more remaining channels based on at least one of a interference pattern, SPS characteristics, or SA decoding information from previous use of the first channel. In such an aspect, the means for performing the cellular D2D communication is configured to perform the cellular D2D communication using a second channel with a highest priority level of the at least one of the one or more remaining channels that is available for the cellular D2D communication. In an aspect, the apparatus 1002/1002' includes means for performing short range wireless communication using the first channel if the at least one of the one or more remaining channels is available for the cellular D2D communication and the UE is capable of short range wireless communication.

In an aspect, the apparatus 1002/1002' includes means for refraining from performing cellular D2D communication if none of the one or more remaining channels is available for cellular D2D communication. In an aspect, the apparatus 1002/1002' includes means for performing short range wireless communication using the first channel if the first channel is occupied by the short range wireless communication and the UE is capable of short range wireless communication. In an aspect, the apparatus 1002/1002' includes means for performing cellular D2D communication using the first channel if the first channel is not occupied by the short range wireless communication. In an aspect, the apparatus 1002/1002' includes means for determining whether at least one of the one or more remaining channels is occupied by short range wireless communication, if the first channel is not occupied by the short range wireless communication, and means for performing short range wireless communication using the at least one of the one or more remaining channels, if at least one of the one or more remaining channels is occupied by short range wireless communication and the UE is capable of short range wireless communication. In such an aspect, the apparatus 1002/1002' includes means for the means for determining whether at least one of the one or more remaining channels is occupied by short range wireless communication is configured to determine whether at least one of the one or more remaining channels is occupied by short range wireless communication if the UE has short range wireless communication capability. In an aspect, the apparatus 1002/1002' includes the means for determining whether the first channel is occupied by short range wireless communication is configured to sense for short range wireless communication based on at least one of a preamble received in the first channel indicating presence of the short range wireless communication, or an energy level in the first channel exceeding a threshold. In an aspect, the apparatus 1002/1002' includes the means for determining whether the first channel is occupied by short range wireless communication is configured to: determine whether the short range wireless communication in the first channel is transmitted by a UE without cellular D2D capability, if the short range wireless communication in the first channel is transmitted by a UE without cellular D2D capability, determine that the first channel is occupied by short range wireless communication, and if the short range wireless communication in the first channel is transmitted by a UE with cellular D2D capability and is not transmitted by a UE without cellular D2D capability, determine that the first channel is not occupied by short range wireless communication. In an aspect, the apparatus 1002/1002' includes the means for determining whether the first channel is occupied by short range wireless communication that is configured to determine whether the short range wireless communication in the first channel is transmitted by a UE without cellular D2D capability is configured to: determine whether a UE without cellular D2D capability transmits short range wireless communication in the first channel during a silence period, wherein no UE with cellular D2D capability is configured to perform short range wireless communication in the first channel during the silence period, wherein one or more UEs including the UE are configured to perform cellular D2D communication in the first channel if a UE without cellular D2D capability during a silence period does not transmit short range wireless communication in the first channel.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   determining a priority level of each channel of a plurality of channels;
   determining whether a first channel of the plurality of channels, the first channel having a highest priority level, is occupied by short range wireless communication; and
   determining availability of one or more remaining channels of the plurality of channels for a cellular device-to-device (D2D) communication when the first channel is occupied by the short range wireless communication, wherein to determine whether the first channel is occupied by short range wireless communications the UE is configured to sense short range wireless communications based on at least one of a preamble received in the first channel indicating presence of the short range wireless communication, or an energy level in the first channel exceeding a threshold, wherein the one or more remaining channels are different from the first channel, and performing short range wireless communication using the first channel when the UE is capable of short range wireless communication.

2. The method of claim 1, further comprising:
   if at least one of the one or more remaining channels is available for the cellular D2D communication, performing the cellular D2D communication using the at least one of the one or more remaining channels that is available for the cellular D2D communication.

3. The method of claim 2, wherein the performing the cellular D2D communication using one of the at least one of the one or more remaining channels that is available for the cellular D2D communication comprises:
   performing the cellular D2D communication using the one of the at least one of the one or more remaining channels based on at least one of a interference pattern, semi-persistent scheduling (SPS) characteristics, or scheduling assignment (SA) decoding information from previous use of the first channel.

4. The method of claim 2, wherein a priority level of the one of the at least one of the one or more remaining channels is the highest among priority levels of the one or more remaining channels.

5. The method of claim 2, wherein the cellular D2D communication using one of the at least one of the one or more remaining channels that is available for the cellular D2D communication is performed when the UE is not capable of short range wireless communication.

6. The method of claim 2, wherein the performing the cellular D2D communication comprises:
   performing the cellular D2D communication using a second channel with a highest priority level of the at least one of the one or more remaining channels that is available for the cellular D2D communication.

7. The method of claim 2,
   wherein the short range wireless communication using the first channel is performed if the at least one of the one or more remaining channels is available for the cellular D2D communication and the UE is capable of short range wireless communication.

8. The method of claim 1, further comprising:
   if none of the one or more remaining channels is available for cellular D2D communication, refraining from performing cellular D2D communication.

9. The method of claim 1, further comprising:
if the first channel is not occupied by the short range wireless communication, performing cellular device-to device (D2D) communication using the first channel.

10. The method of claim 1, further comprising:
if the first channel is not occupied by the short range wireless communication, determining whether at least one of the one or more remaining channels is occupied by short range wireless communication; and
if at least one of the one or more remaining channels is occupied by short range wireless communication and the UE is capable of short range wireless communication, performing the short range wireless communication using the at least one of the one or more remaining channels.

11. The method of claim 10, wherein the determining whether at least one of the one or more remaining channels is occupied by short range wireless communication is performed if the UE has short range wireless communication capability.

12. The method of claim 1, wherein the determining whether the first channel is occupied by short range wireless communication comprises:
determining whether the short range wireless communication in the first channel is transmitted by a UE without cellular D2D capability;
if the short range wireless communication in the first channel is transmitted by a UE without cellular D2D capability, determining that the first channel is occupied by short range wireless communication; and
if the short range wireless communication in the first channel is transmitted by a UE with cellular D2D capability and is not transmitted by a UE without cellular D2D capability, determining that the first channel is not occupied by short range wireless communication.

13. The method of claim 12, wherein the determining whether the short range wireless communication in the first channel is transmitted by a UE without cellular D2D capability comprises:
determining whether a UE without cellular D2D capability transmits short range wireless communication in the first channel during a silence period, wherein no UE with cellular D2D capability is configured to perform short range wireless communication in the first channel during the silence period,
wherein one or more UEs including the UE are configured to perform cellular D2D communication in the first channel if a UE without cellular D2D capability during a silence period does not transmit short range wireless communication in the first channel.

14. The method of claim 13, wherein the cellular D2D communication is performed in the first channel based on at least one of a interference pattern, semi-persistent scheduling (SPS) characteristics, or scheduling assignment (SA) decoding information carried from previous use of a previous channel.

15. The method of claim 1, wherein the cellular D2D communication is cellular vehicle-to-vehicle (V2V) communication.

16. The method of claim 1, wherein the short range wireless communication is a dedicated short range communication (DSRC) or communication based on IEEE 802.11p.

17. The method of claim 1, where the priority level of each channel of the plurality of channels is indicated by a base station or is preconfigured in the UE.

18. A user equipment (UE) for wireless communication, comprising:
a memory; and
at least one processor coupled to the memory and configured to:
determine a priority level of each channel of a plurality of channels;
determine whether a first channel of the plurality of channels, the first channel having a highest priority level, is occupied by short range wireless communication; and
determine availability of one or more remaining channels of the plurality of channels for a cellular device-to-device (D2D) communication when the first channel is occupied by the short range wireless communication, wherein to determine whether the first channel is occupied by short range wireless communications the UE is configured to sense short range wireless communications based on at least one of a preamble received in the first channel indicating presence of the short range wireless communication, or an energy level in the first channel exceeding a threshold, wherein the one or more remaining channels are different from the first channel, and perform short range wireless communication using the first channel when the UE is capable of short range wireless communication.

19. The UE of claim 18, where the at least one processor is further configured to:
if at least one of the one or more remaining channels is available for the cellular D2D communication, perform the cellular D2D communication using the at least one of the one or more remaining channels that is available for the cellular D2D communication.

20. The UE of claim 19, where the at least one processor is further configured to perform the short range wireless communication using the first channel:
if the at least one of the one or more remaining channels is available for the cellular D2D communication and the UE is capable of short range wireless communication.

21. The UE of claim 18, where the at least one processor is further configured to:
if none of the one or more remaining channels is available for cellular D2D communication, refrain from performing cellular D2D communication.

22. The UE of claim 18, where the at least one processor is further configured to:
if the first channel is not occupied by the short range wireless communication, perform cellular device-to device (D2D) communication using the first channel.

23. The UE of claim 18, where the at least one processor is further configured to:
if the first channel is not occupied by the short range wireless communication, determine whether at least one of the one or more remaining channels is occupied by short range wireless communication; and
if at least one of the one or more remaining channels is occupied by short range wireless communication and the UE is capable of short range wireless communication, perform short range wireless communication using the at least one of the one or more remaining channels.

24. The UE of claim 23, wherein the at least one processor is configured to determine whether at least one of the one or more remaining channels is occupied by short range wireless communication if the UE has short range wireless communication capability.

25. A user equipment (UE) for wireless communication, comprising:
means for determining a priority level of each channel of a plurality of channels;
means for determining whether a first channel of the plurality of channels, the first channel having a highest priority level, is occupied by short range wireless communication;
means for determining availability of one or more remaining channels of the plurality of channels for cellular device-to-device (D2D) communication when the first channel is occupied by the short range wireless communication, wherein to determine whether the first channel is occupied by short range wireless communications the UE is configured to sense short range wireless communications based on at least one of a preamble received in the first channel indicating presence of the short range wireless communication, or an energy level in the first channel exceeding a threshold, wherein the one or more remaining channels are different from the first channel; and
means for performing short range wireless communication, the means for performing short range wireless communication being configured to perform short range wireless communication using the first channel if the first channel is occupied by the short range wireless communication and the UE is capable of short range wireless communication.

26. The UE of claim 25, further comprising:
means for performing the cellular D2D communication using at least one of the one or more remaining channels that is available for the cellular D2D communication if the at least one of the one or more remaining channels is available for the cellular D2D communication.

27. A non-transitory computer-readable medium storing computer executable code, comprising code to:
determine a priority level of each channel of a plurality of channels;
determine whether a first channel of the plurality of channels, the first channel having a highest priority level, is occupied by short range wireless communication; and
determine availability of one or more remaining channels of the plurality of channels for a cellular device-to-device (D2D) communication when the first channel is occupied by the short range wireless communication, wherein to determine whether the first channel is occupied by short range wireless communications the UE is configured to sense short range wireless communications based on at least one of a preamble received in the first channel indicating presence of the short range wireless communication, or an energy level in the first channel exceeding a threshold, wherein the one or more remaining channels are different from the first channel, and perform short range wireless communication using the first channel when the UE is capable of short range wireless communication.

* * * * *